(12) United States Patent
Kim et al.

(10) Patent No.: US 11,614,083 B2
(45) Date of Patent: Mar. 28, 2023

(54) INTERNALLY TENSIONED INFLATABLE STRUCTURE THAT IS POSABLE IN MULTIPLE POSITIONS

(71) Applicants: GM GLOBAL TECHNOLOGY OPERATIONS LLC, Detroit, MI (US); THE REGENTS OF THE UNIVERSITY OF MICHIGAN, Ann Arbor, MI (US)

(72) Inventors: Wonhee M. Kim, Royal Oak, MI (US); Paul W. Alexander, Ypsilanti, MI (US); Jonathan E. Luntz, Ann Arbor, MI (US); Diann Brei, Milford, MI (US); Laura Alejandra Giner Munoz, Ann Arbor, MI (US); Kunj P. Patel, Ann Arbor, MI (US); Adeline Emily Wihardja, Ann Arbor, MI (US); Noah Luntzlara, Ann Arbor, MI (US)

(73) Assignees: GM GLOBAL TECHNOLOGY OPERATIONS LLC, Detroit, MI (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 723 days.

(21) Appl. No.: 16/566,631

(22) Filed: Sep. 10, 2019

(65) Prior Publication Data
US 2021/0071659 A1     Mar. 11, 2021

(51) Int. Cl.
*F04B 49/00* (2006.01)
*A47C 7/50* (2006.01)
(Continued)

(52) U.S. Cl.
CPC .............. *F04B 49/00* (2013.01); *A47C 7/506* (2013.01); *B60N 2/914* (2018.02); *F04B 45/02* (2013.01);
(Continued)

(58) Field of Classification Search
CPC ........ F15B 15/10; F15B 15/24; F15B 15/103; B60N 2/914; F16J 3/02; F16J 3/04; F16J 3/048
See application file for complete search history.

(56) References Cited

U.S. PATENT DOCUMENTS

| 2,979,287 A | 4/1961 | Ross |
| 3,138,506 A | 6/1964 | Ross |

(Continued)

FOREIGN PATENT DOCUMENTS

CN      104368079 A     2/2015

OTHER PUBLICATIONS

U.S. Appl. No. 15/954,788, filed Apr. 14, 2018, Khalighi et al.
(Continued)

*Primary Examiner* — Thomas E Lazo

(57) ABSTRACT

An inflatable structure includes a top end cap, a bottom end cap, a bladder, a nozzle, a loop, and a first tether. The bladder is attached to the top and bottom end caps and is configured to hold pressurized fluid therebetween. The nozzle is configured to allow fluid to enter and exit the bladder. The loop is attached to one of the top and bottom end caps. A tether is disposed within the bladder, coupled to the other one of the top and bottom end caps, and extends through the at least one loop. The top end cap assumes a first position when the bladder is inflated. When the top end cap is adjusted from the first position to a second position, the first tether is configured to maintain the top end cap in the second position.

20 Claims, 9 Drawing Sheets

(51) Int. Cl.
  F04B 45/02 (2006.01)
  F15B 15/10 (2006.01)
  F15B 15/24 (2006.01)
  B60N 2/90 (2018.01)
  *A47B 91/00* (2006.01)
  *B66F 7/08* (2006.01)

(52) U.S. Cl.
  CPC .............. F15B 15/10 (2013.01); F15B 15/24 (2013.01); *A47B 91/005* (2013.01); *B66F 7/085* (2013.01); *F04B 2207/02* (2013.01)

(56) References Cited

U.S. PATENT DOCUMENTS

| | | | |
|---|---|---|---|
| 4,292,701 A | 10/1981 | Woychick | |
| 4,826,715 A * | 5/1989 | Lee | A47C 27/081 |
| | | | 428/64.1 |
| 5,152,018 A | 10/1992 | Lea | |
| 5,568,761 A * | 10/1996 | Legendre | F15B 11/0365 |
| | | | 92/48 |
| 7,234,184 B2 * | 6/2007 | Yang | A47C 27/087 |
| | | | 5/644 |
| 9,821,862 B2 | 11/2017 | Han et al. | |
| 10,059,239 B2 * | 8/2018 | Jaranson | B60N 2/665 |
| 10,070,853 B2 * | 9/2018 | Gould | A61B 17/0218 |
| 10,398,235 B2 | 9/2019 | Lin et al. | |
| 10,835,229 B2 * | 11/2020 | Gould | A61B 17/0218 |
| 2004/0188988 A1 | 9/2004 | Wipasuramonton et al. | |
| 2006/0288489 A1 | 12/2006 | Yang | |
| 2007/0046001 A1 | 3/2007 | Hirata | |
| 2007/0200329 A1 | 8/2007 | Ma | |
| 2008/0296946 A1 | 12/2008 | Reynolds et al. | |
| 2009/0320211 A1 | 12/2009 | Lau | |
| 2011/0068604 A1 | 3/2011 | Neuberger et al. | |
| 2012/0126572 A1 | 5/2012 | Hjelm et al. | |
| 2014/0101861 A1 | 4/2014 | Gowda et al. | |
| 2014/0225341 A1 * | 8/2014 | Vetor | B60G 11/27 |
| | | | 280/124.16 |
| 2015/0201760 A1 | 7/2015 | Lin et al. | |
| 2016/0220321 A1 * | 8/2016 | Mylonas | A61B 34/71 |
| 2017/0042338 A1 | 2/2017 | Yang | |
| 2017/0106830 A1 | 4/2017 | Rohn et al. | |
| 2018/0065690 A1 | 3/2018 | Han et al. | |
| 2018/0281874 A1 | 10/2018 | Han et al. | |
| 2018/0362142 A1 | 12/2018 | Castro et al. | |
| 2019/0186463 A1 | 6/2019 | Akay et al. | |
| 2019/0195427 A1 | 6/2019 | Alexander et al. | |
| 2019/0226197 A1 | 7/2019 | Bright | |
| 2019/0299909 A1 * | 10/2019 | Alexander | B62D 1/183 |
| 2019/0337469 A1 | 11/2019 | Preisler et al. | |
| 2020/0255117 A1 | 8/2020 | Prokhorov | |

OTHER PUBLICATIONS

U.S. Appl. No. 15/970,221, filed May 3, 2018, Dadheech et al.
U.S. Appl. No. 16/114,423, filed Aug. 28, 2018, Alexander et al.
U.S. Appl. No. 16/227,177, filed Dec. 20, 2018, Han et al.
U.S. Appl. No. 16/443,029, filed Jun. 17, 2019, Han et al.
U.S. Appl. No. 16/566,374, filed Sep. 10, 2019, Han et al.
U.S. Appl. No. 16/566,584, filed Sep. 10, 2019, Kim et al.
U.S. Appl. No. 16/566,683, filed Sep. 10, 2019, Kim et al.
First Office Action dated Aug. 18, 2022 corresponding to Chinese Patent Application No. 202010946788.0.

* cited by examiner

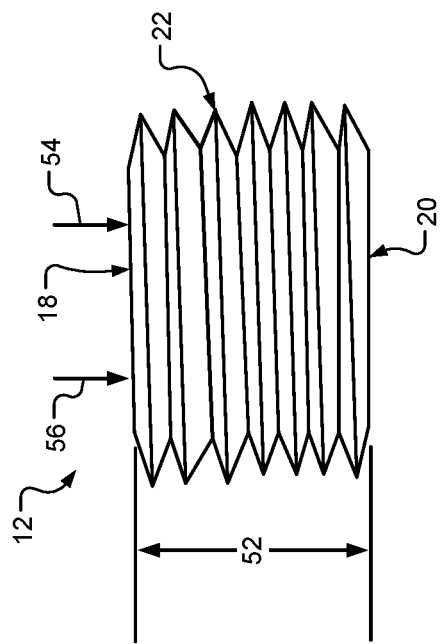
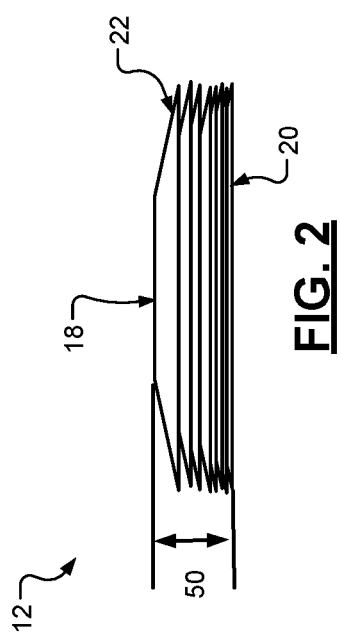
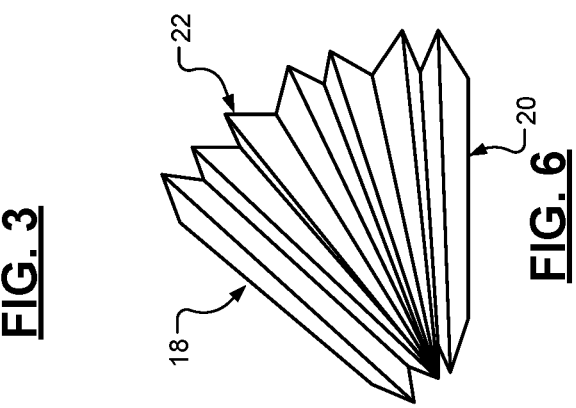
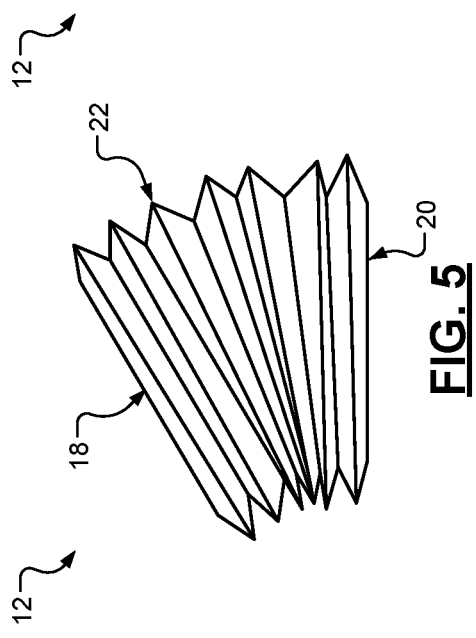
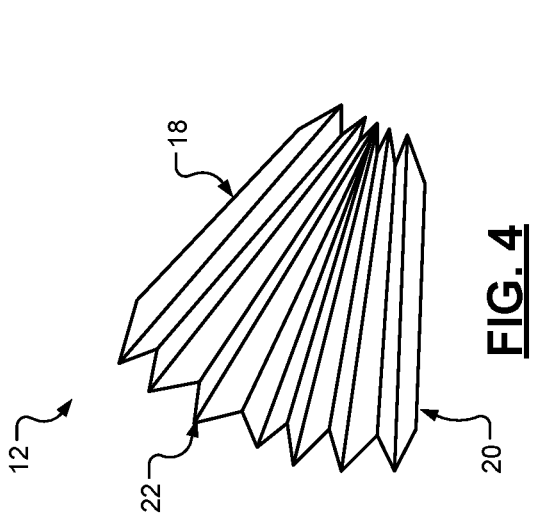
FIG. 2
FIG. 3
FIG. 4
FIG. 5
FIG. 6

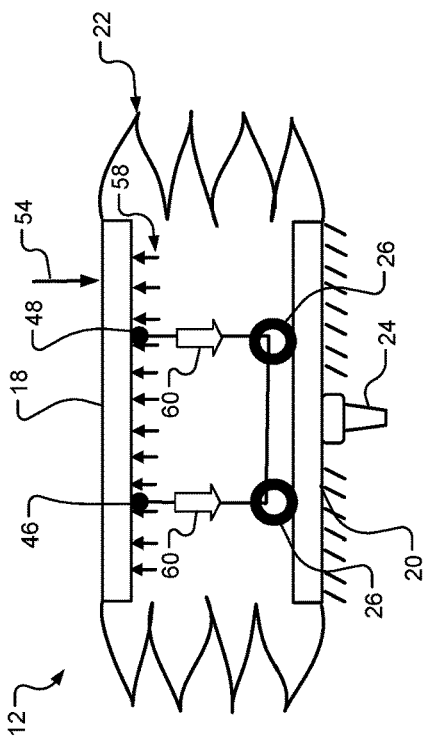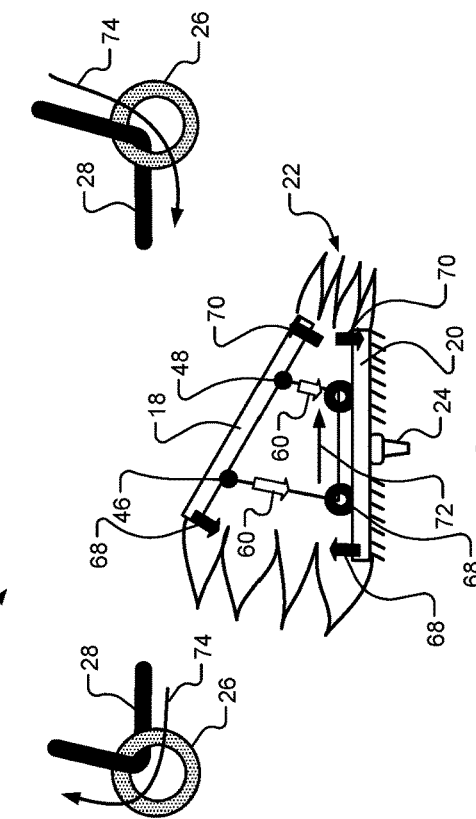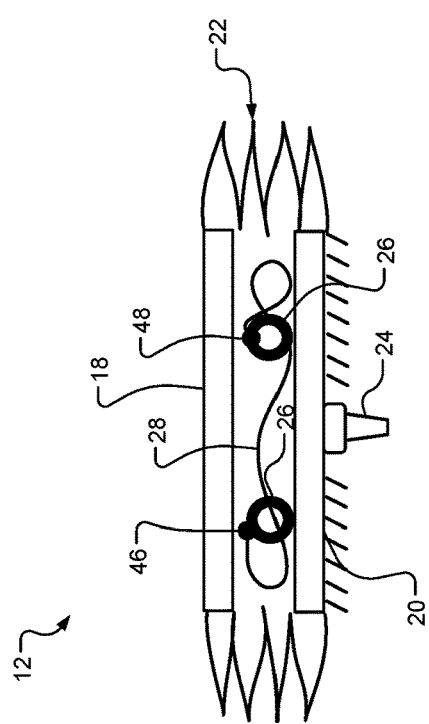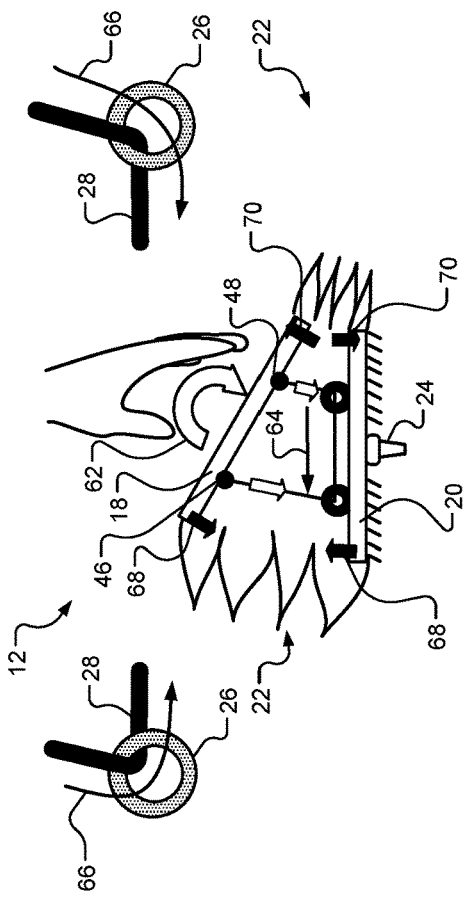

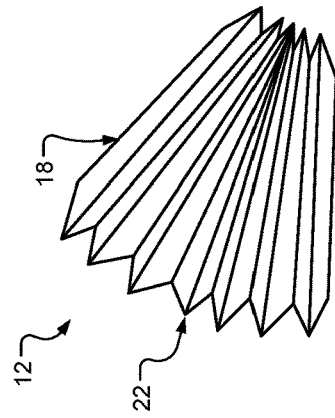
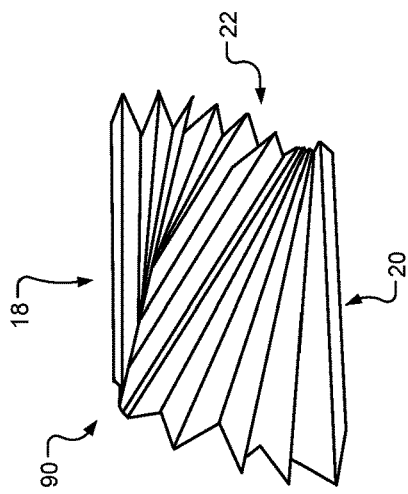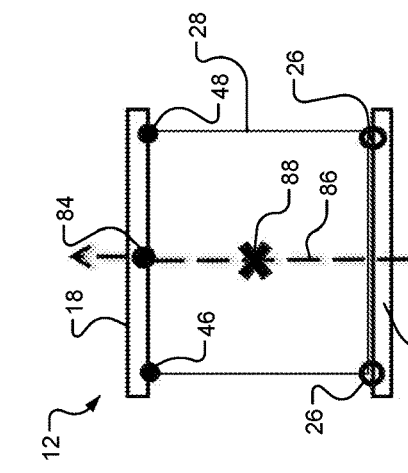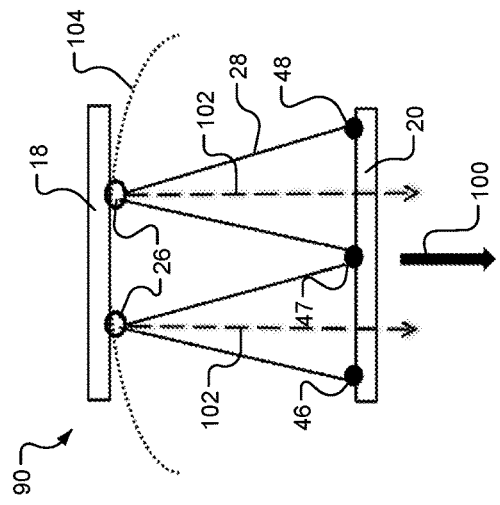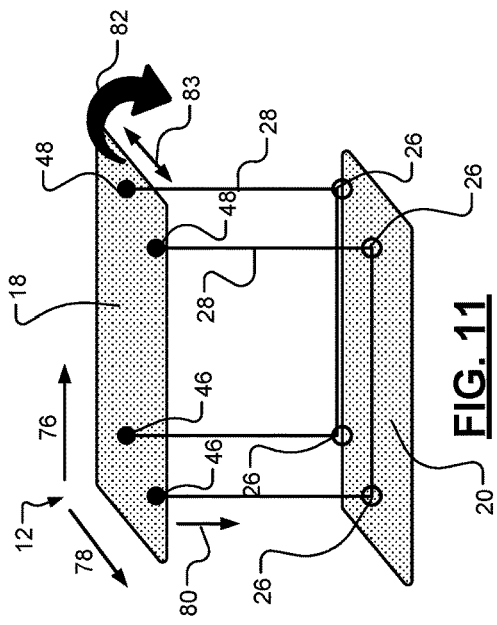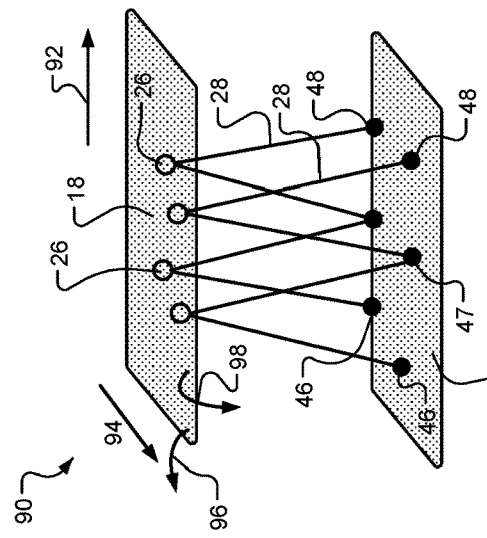

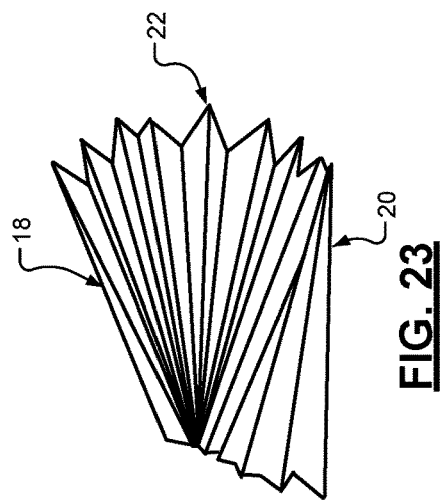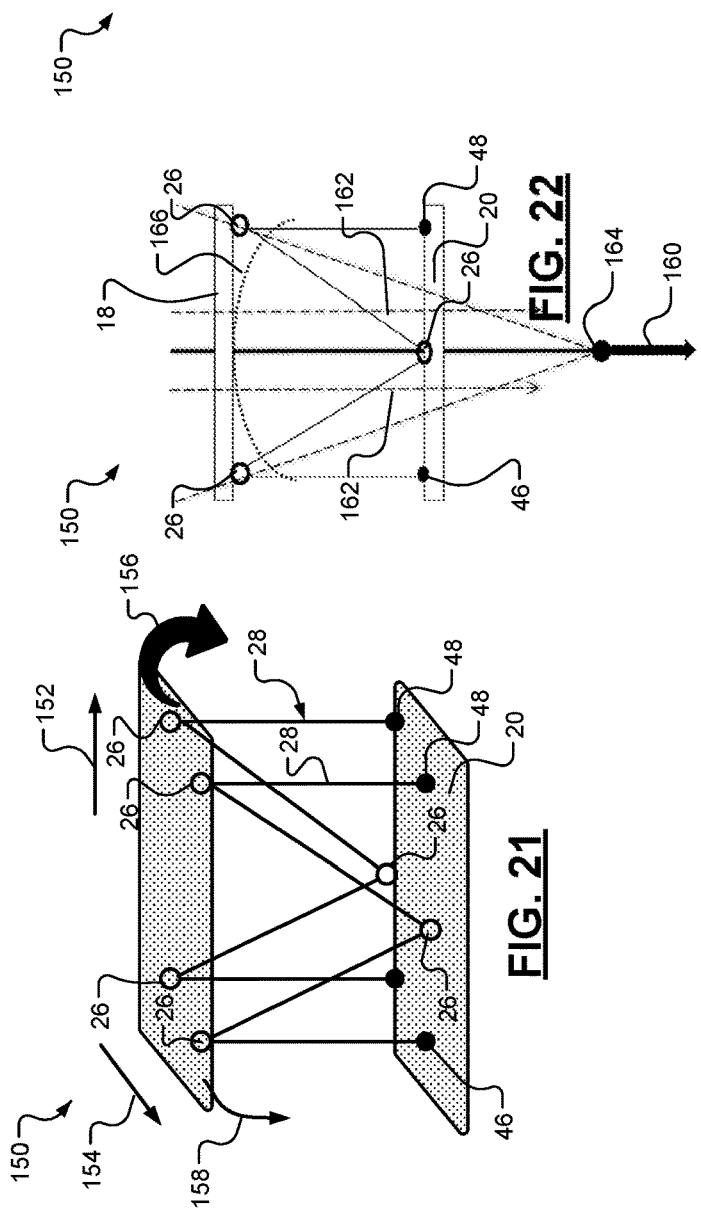

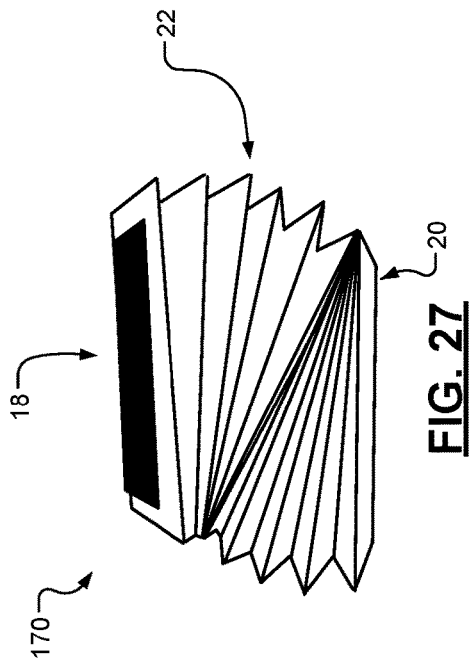
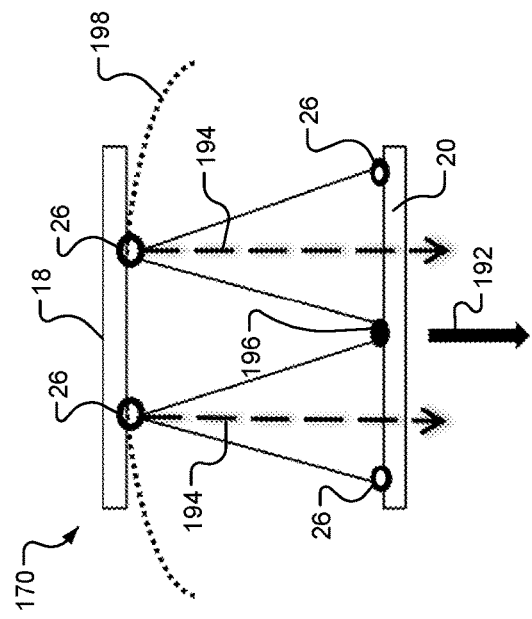
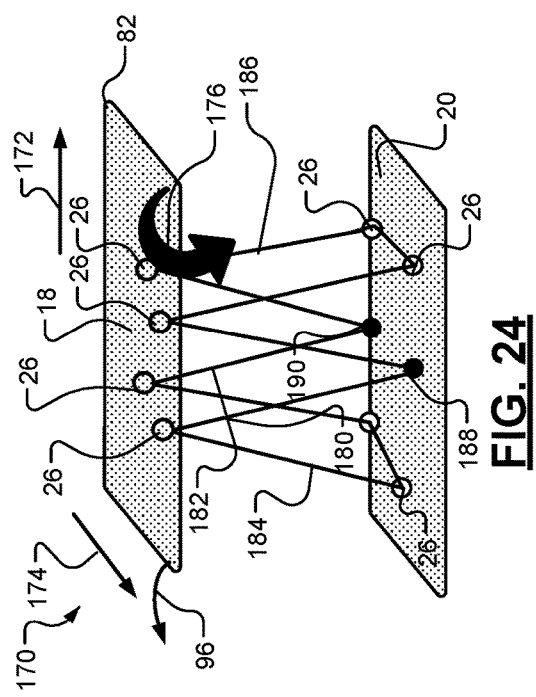
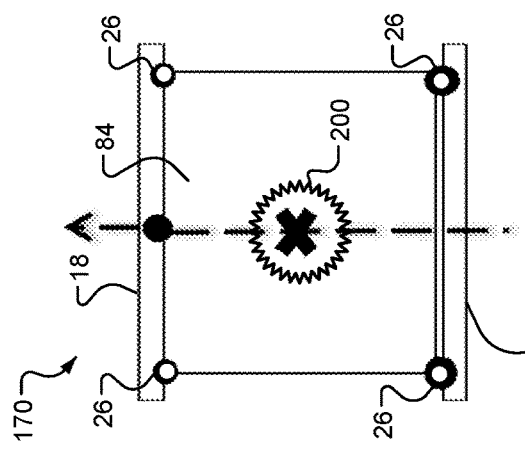

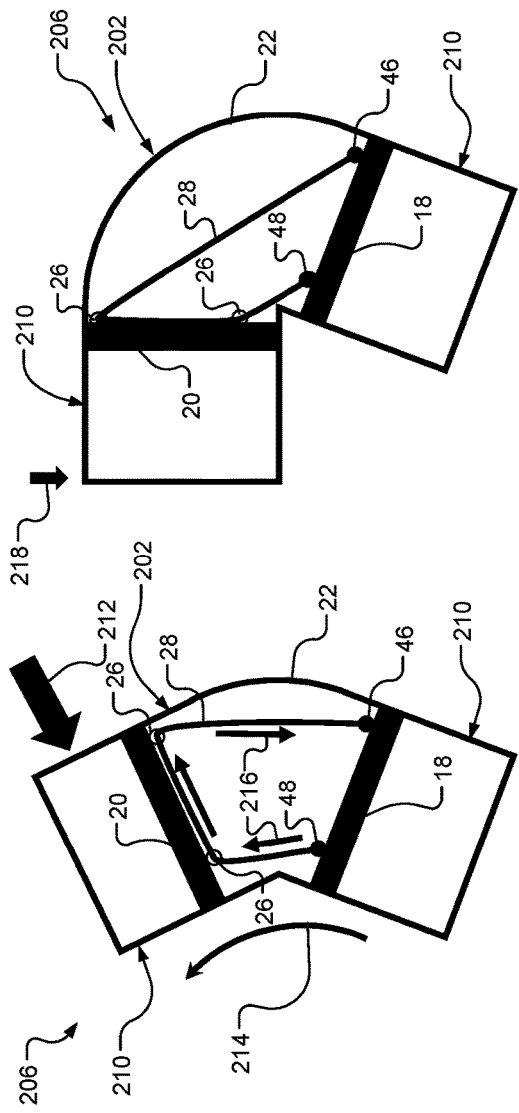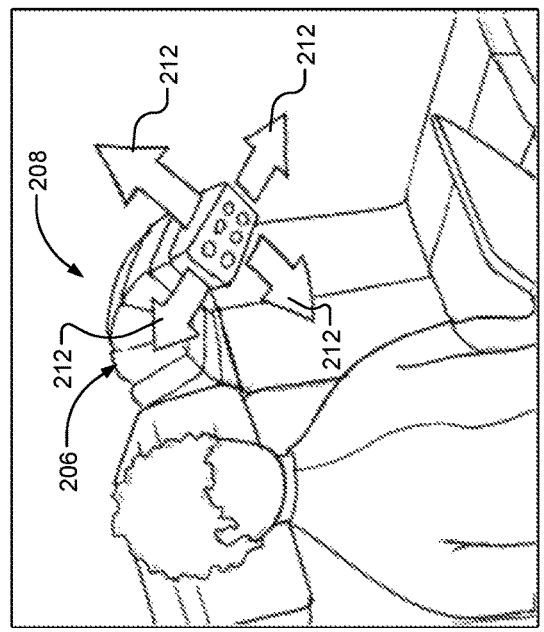

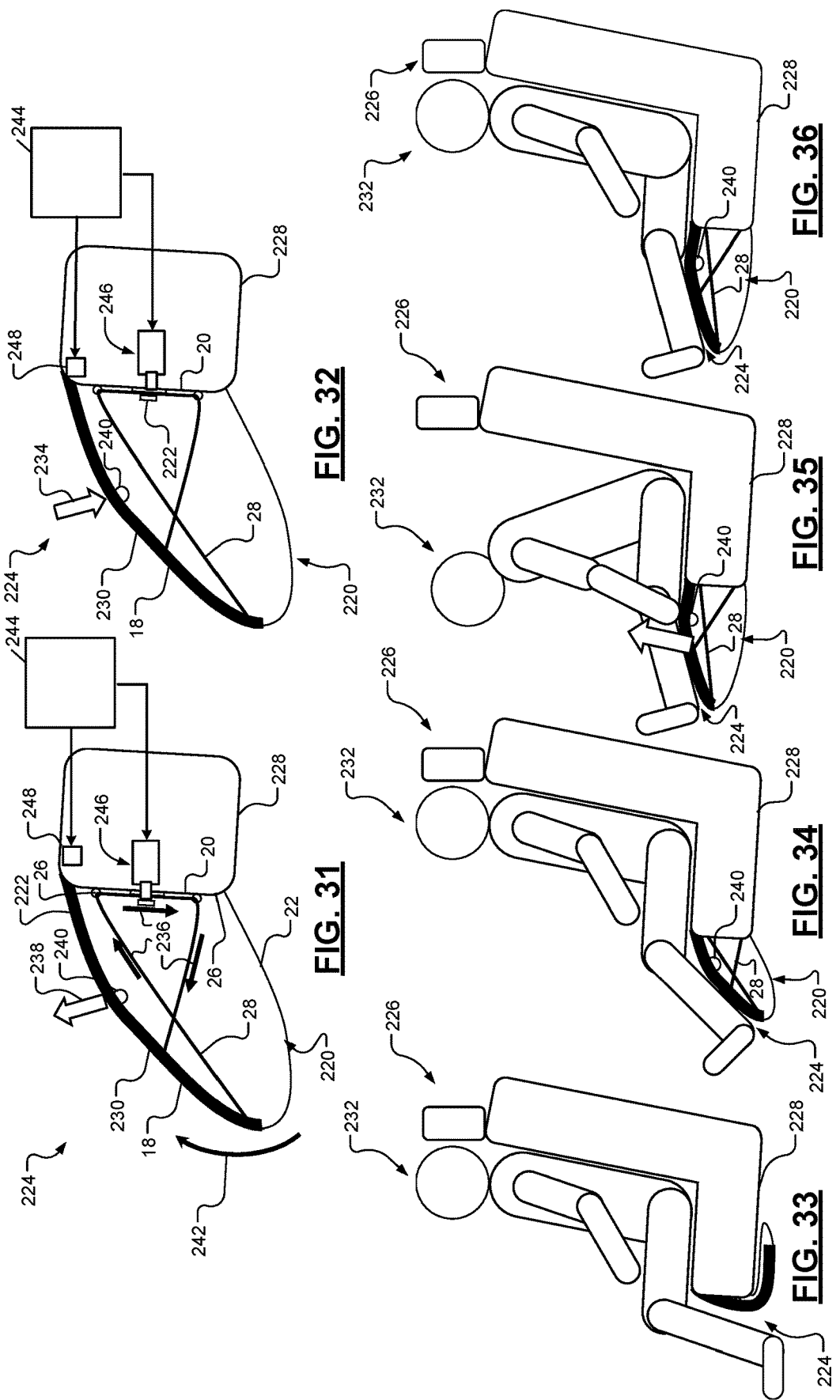

INTERNALLY TENSIONED INFLATABLE STRUCTURE THAT IS POSABLE IN MULTIPLE POSITIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to internally tensioned inflatable structures that are posable in multiple positions.

Internally tensioned inflatable structures typically include a bladder that holds pressurized air and threads that are attached to opposite internal surfaces of the bladder. As the bladder is inflated, the pressure within the bladder causes the bladder to expand outward and thereby applies tension to the threads, which in turn limit expansion of the bladder. In addition to limiting expansion of the bladder, the threads increase the amount of compressive load that the bladder may withstand before the bladder deforms due to the compressive load. Thus, internally tensioned inflatable structures are used in devices such as airplane wings that require a high compressive strength to weight ratio.

SUMMARY

An inflatable structure according to the present disclosure includes a top end cap, a bottom end cap, a bladder, a nozzle, a loop, and a first tether. The bladder is attached to the top and bottom end caps and is configured to hold pressurized fluid therebetween. The nozzle is configured to allow fluid to enter and exit the bladder. The loop is attached to one of the top and bottom end caps. A tether is disposed within the bladder, coupled to the other one of the top and bottom end caps, and extends through the at least one loop. The top end cap assumes a first position when the bladder is inflated and, when the top end cap is adjusted from the first position to a second position, the first tether is configured to maintain the top end cap in the second position.

In one example, when a compressive load is applied to the top end cap, friction between the first tether and the at least one loop prevents the first tether from sliding through the at least one loop, and thereby maintains the top end cap in the second position.

In one example, the bladder is disposed about and attached to perimeter edges of the top and bottom end caps.

In one example, the bladder includes sidewalls, and each of the sidewalls includes a plurality of folds that reduce a stiffness of the sidewalls in an axial direction of the inflatable structure.

In one example, the first tether is coupled to the top end cap, the first tether has a first end and a second end opposite of the first end, and the first and second ends of the first tether are fixed to the bottom end cap.

In one example, the at least one loop includes a first pair of loops attached to the bottom end cap, and the first tether extends through the first pair of loops.

In one example, the inflatable structure further includes a second pair of loops attached to the bottom end cap, and a second tether coupled to the top end cap and extending through the second pair of loops attached to the bottom end cap. When the top end cap is adjusted from the first position to the second position, the first and second tethers are configured to maintain the top end cap in the second position.

In one example, the first tether is disposed within a first plane and the second tether is disposed within a second plane that is parallel to the first plane.

In one example, each of the first and second tethers has a first end and a second end opposite of the first end, the first and second ends of each of the first and second tethers are fixed to the top end cap, and the first and second tethers are configured to maintain the top end cap in the second position when the top end cap is adjusted from the first position to the second position by applying a bending load to the top end cap.

In one example, each of the first and second tethers has a first end, a second end opposite of the first end, and a midpoint disposed midway between the first and second ends. The first end, the second end, and the midpoint of each of the first and second tethers are fixed to the top end cap. The first and second tethers are configured to maintain the top end cap in the second position when the top end cap is adjusted from the first position to the second position by applying a shear load to the top end cap.

In one example, the inflatable structure further includes a second pair of loops attached to the bottom end cap, a third pair of loops attached to the top end cap, and a fourth pair of loops attached to the top end cap. The first tether extends through the first, second, third, and fourth pairs of loops, and the first tether is configured to maintain the top end cap in the second position when the top end cap is adjusted from the first position to the second position by applying a bending load to the top end cap.

In one example, the inflatable structure further includes a second pair of loops attached the bottom end cap, a third pair of loops attached to the top end cap, and a fourth pair of loops attached to the top end cap. The first tether extends through the first, second, third, and fourth pairs of loops. The first tether includes a first segment and a second segment. The first segment extends between the third pair of loops and is fixed to the bottom end cap. The second segment extends between the fourth pair of loops and is fixed to the bottom end cap. The first tether is configured to maintain the top end cap in the second position when the top end cap is adjusted from the first position to the second position by applying either one of a bending load or a shear load to the top end cap.

In one example, the at least one loop includes a first pair of loops attached to the top end cap, the first tether has a first end and a second end opposite of the first end. The first and second ends of the first tether are fixed to the bottom end cap. The inflatable structure further includes a second pair of loops attached to the top end cap, a first loop attached to the bottom end cap, a second loop attached to the bottom end cap, and a second tether having a first end and a second end opposite of the first end. The first and second ends of the second tether are fixed to the bottom end cap. The first tether extends through the first pair of loops and the first loop. The second tether extends through the second pair of loops and the second loop. The first and second tethers are configured to maintain the top end cap in the second position when the top end cap is adjusted from the first position to the second position by applying either one of a bending load or a shear load to the top end cap.

Another inflatable structure according to the present disclosure includes a top end cap, a bottom end cap, a bladder, a nozzle, a pair of loops, a tether, and a clamp. The bladder is attached to the top and bottom end caps and configured to hold pressurized fluid between the top and bottom end caps. The nozzle is configured to allow fluid to enter and exit the bladder. The pair of loops is attached to the bottom end cap. The tether is disposed within the bladder, coupled to the top end cap, and extending through the pair of loops. The clamp is attached to the bottom end cap and adjustable between a first position and a second position. When the clamp is in the first position, the clamp allows the tether to slide through the pair of loops and thereby allows the top end cap to be repositioned relative to the bottom end cap. When the clamp is in the second position, the clamp prevents the tether from sliding through the pair of loops and thereby maintains a position of the top end cap relative to the bottom end cap.

In one example, at least one loop of the pair of loops comprises the damp, and the clamp is adjusted from the first position to the second position by moving the at least one loop toward the bottom end cap to clamp the tether between the at least one loop and the bottom end cap.

In one example, the pair of loops includes a first loop and a second loop, and the clamp is disposed between the first and second loops.

An inflatable system according to the present disclosure includes an inflatable structure, a compressor, and a compressor control module. The inflatable structure includes a top end cap, a bottom end cap, a bladder, a nozzle, at least one loop, and at least one tether. The bladder is attached to the top and bottom end caps and configured to hold pressurized fluid. The nozzle is configured to allow fluid to enter and exit the bladder. The at least one loop is attached to one of the top and bottom end caps. The at least one tether is coupled to the other one of the top and bottom end caps and extends through the at least one loop. The compressor is in fluid communication with the bladder through the nozzle and is operable to inflate the bladder. The compressor control module is configured to control the compressor to adjust a pressure within the bladder between a first pressure and a second pressure that is less than the first pressure. The at least one tether is configured to maintain the top end cap in any one of M positions when the bladder pressure is equal to the first pressure. The at least one tether is configured to maintain the top end cap in any one of N positions when the bladder pressure is equal to the second pressure. M and N are numbers, and N is greater than M.

In one example, the at least one loop includes a first pair of loops attached to the bottom end cap, and the at least one tether includes a first tether having a first end and a second end opposite of the first end. The first tether extends through the first pair of loops, and the first and second ends of the first tether are fixed to the top end cap.

In one example, the at least one loop further includes a second pair of loops attached to the bottom end cap, and the at least one tether further includes a second tether having a first end and a second end opposite of the first end. The second tether extends through the second pair of loops, and the first and second ends of the second tether are fixed to the top end cap.

In one example, the first tether is disposed within a first plane and the second tether is disposed within a second plane that is parallel to the first plane.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a side view of the inflatable structure of FIG. 1 when the inflatable structure is in a stowed or uninflated state;

FIG. 3 is a side view of the inflatable structure of FIG. 1 when the inflatable structure is a deployed or inflated state;

FIG. 4 is a side view of the inflatable structure of FIG. 1 when the inflatable structure is inflated and adjusted to a full right position;

FIG. 5 is a side view of the inflatable structure of FIG. 1 when the inflatable structure is inflated and adjusted to an intermediate position;

FIG. 6 is a side view of the inflatable structure of FIG. 1 when the inflatable structure is inflated and adjusted to a full left position;

FIG. 7 is a section view of the inflatable structure of FIG. 1 when the inflatable structure is uninflated;

FIG. 8 is a section view of the inflatable structure of FIG. 1 when the inflatable structure is inflated;

FIG. 9 is a section view of the inflatable structure of FIG. 1 when a bending load is applied to adjust the inflatable structure to the full right position;

FIG. 10 is a section view of the inflatable structure of FIG. 1 when the bending load is released and the inflatable structure is an the full right position;

FIG. 11 is a perspective view of the inflatable structure of FIG. 1 without a bladder, FIG. 12 is a schematic of the structure of FIG. 1;

FIG. 13 is a side view of the inflatable structure of FIG. 1 in the full right position;

FIG. 14 is a perspective view of another inflatable structure according to the present disclosure in a first position, where the inflatable structure is posable in a second position when a shear load is applied to the inflatable structure;

FIG. 15 is a schematic of the inflatable structure of FIG. 14 in the first position;

FIG. 16 is a side view of the inflatable structure of FIG. 14 in the second position:

FIG. 21 is a perspective view of another inflatable structure according to the present disclosure in a first position, where the inflatable structure is posable in a second position when a bending or shear load is applied to the inflatable structure;

FIG. 22 is a schematic of the inflatable structure of FIG. 21 in the first position;

FIG. 23 is a side view of the inflatable structure of FIG. 21 in the second position;

FIG. 24 is a perspective view of another inflatable structure according to the present disclosure in a first position, where the inflatable structure is posable in a second position when a bending or shear load is applied to the inflatable structure;

FIGS. 25 and 26 are front and side view schematics, respectively, of the inflatable structure of FIG. 24 in the first position;

FIG. 27 is a side view of the inflatable structure of FIG. 24 in the second position;

FIG. 28 is a section view of the inflatable structure of FIG. 1 forming an joint, where the inflatable structure is shown the intermediate position;

FIG. 29 is a section view of the joint of FIG. 28 with the inflatable structure shown in the full left position;

FIG. 30 is a perspective view of the joint of FIG. 28 incorporated into a lamp; and FIGS. 31-36 are section views of another inflatable structure according to the present disclosure incorporated in an adjustable footrest of a reclining chair.

In the drawings, reference numbers may be reused to identify similar and/or identical elements.

DETAILED DESCRIPTION

Conventional internally tensioned inflatable structures are not ideal for use in posable devices, such as a posable arm of a gooseneck lamp, because the inflatable structures assume only one position once the inflatable structures are inflated. In other words, the inflatable structures assume an initial position when the inflatable structures are fully inflated, and the inflatable structures cannot be adjusted from that position without deflating the inflatable structures. Thus, posable devices typically include rigid components that enable to the devices to be posed in multiple positions. Due to the rigid components, the storability (e.g., the ability to store in small spaces) of conventional posable devices is limited.

An inflatable structure according to the present disclosure includes certain features that enable the inflatable structure to be posed in multiple positions when the inflatable structure is fully inflated. The inflatable structure includes a top end cap, a bottom end cap, a bladder extending between the top and bottom end caps and configured to hold pressurized air, one or more loops attached to the top and/or bottom end cap(s), and one or more tethers extending through the loops. In one example, the inflatable structure includes two pairs of loops attached to the bottom end cap, and a pair of tethers that extends through one of the pairs of loops and have ends that are fixed to the top end cap.

When the inflatable structure is fully inflated, friction between the tethers and the loops resists movement or deformation of the inflatable structure when a load is applied to the inflatable structure. If the load is sufficient to overcome the static friction, the inflatable structure moves or deforms from its initially inflated position to another position. If the load is released from the inflatable structure, friction between the tethers and the loops maintains the inflatable structure and the other position.

Some inflatable structures described herein are posable in every direction in which the inflatable structures can be moved or deforms. Other inflatable structures described herein are posable in only some of the directions in which the inflatable structures can be moved or deformed. In addition, the number of directions in which the inflatable structures can be moved or deformed varies, and the types of directions (e.g., bending, shear, etc.) in which the inflatable structures can be moved or deformed varies.

Figure 1:
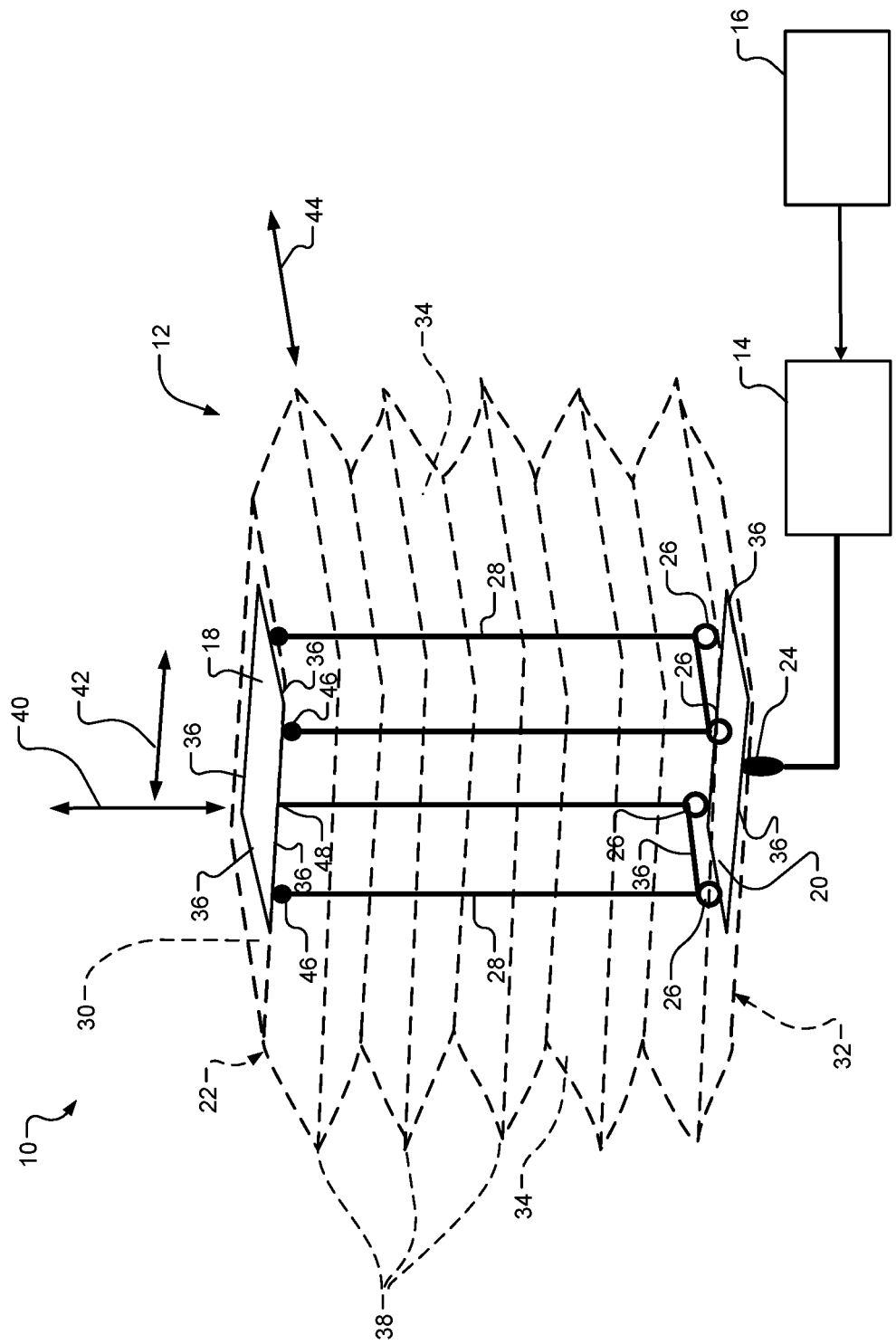
FIG. 1 is a perspective view of an inflatable structure according to the present disclosure.

Referring now to FIG. 1, inflatable system 10 includes an inflatable structure 12, compressor 14, and a compressor control module 16. The inflatable structure 12 is inflatable from a stowed or uninflated state to a deployed or inflated state. When the inflatable structure 12 is initially inflated, the inflatable structure 12 is in a first position. When an external moment or bending load is applied to the inflatable structure 12 to adjust the inflatable structure 12 from a first position to a second position, the inflatable structure 12 stays in the second position after the bending load is released.

The compressor 14 is in fluid communication with the inflatable structure 12. The compressor 14 is operable to inflate the inflatable structure 12. The compressor 14 may also be operable to deflate the inflatable structure 12. For example, the compressor 14 may include a valve, and the valve may be opened when the compressor 14 is deactivated to allow fluid to exit the inflatable structure 12.

The compressor control module 16 controls the compressor 14 to inflate the inflatable structure 12. The compressor control module 16 may also control the compressor 14 to deflate the inflatable structure 12. The compressor control module 16 may inflate and/or deflate the inflatable structure 12 in response to a user input.

The inflatable structure 12 includes a top end cap 18, a bottom end cap 20, a bladder 22, nozzle 24, a plurality of eyelets or loops 26, and a pair of tethers 28. The bladder 22 is attached to the top and bottom end caps 18 and 20 and holds pressurized fluid between the top and bottom end caps 18 and 20. The nozzle 24 extends through one of the top and bottom end caps 18 and 20 and allows fluid to enter or exit the bladder 22. In the example shown, the nozzle 24 extends through the bottom end cap 20.

The loops 26 are disposed within the bladder 22 and are attached to at least one of the top and bottom end caps 18 and 20. In the example shown, the loops 26 are attached to the bottom end cap 20. The loops 26 may be attached to the top and/or bottom end caps 18 and/or 20 using a threaded connection. The tethers 28 are disposed within the bladder 22, coupled to at least one of the top and bottom end caps 18 and 20, and extend through the loops 26. In the example shown, each tether 28 is coupled to the top end cap 18 using a fixed attachment, such as adhesive, and each tether 28 is coupled to the bottom end cap 20 using a sliding attachment, such as by passing each tether 28 through two of the loops 26. In addition, each tether 28 forms a U-shaped. In other examples, the tethers 28 may be coupled to the top and/or bottom end caps 18 and/or 20 using the fixed attachment. In other examples, the tethers 28 may be coupled to the top and/or bottom end caps 18 and/or 20 using the sliding attachment (e.g., the tether 28 extending through one or more of the loops 26 while the one or more loops 26 are attached to the top and/or bottom end caps 18 and/or 20).

The tethers 28 limit the amount by which the bladder 22 expands when the bladder 22 is inflated. In addition, the tethers 28 increase the structural rigidity of the inflatable structure 12, and thereby resist motion or deformation of the inflatable structure 12 when a load is applied to the inflatable structure 12. Further, the tethers 28 restrict the number of directions in which the inflatable structure 12 moves or deforms, and the types of directions in which the inflatable structure 12 moves or deforms. In other words, the tethers 28 restrict the degrees of freedom of the inflatable structure 12 and the types of the degrees of freedom of the inflatable structure 12. Moreover, when a load is applied to the inflatable structure 12 to adjust the inflatable structure 12 from a first position to a second position, friction between the tethers 28 and the loops 26 is sufficient to maintain the inflatable structure 12 and the second position.

The material and geometry of the top and bottom end caps 18 and 20 is selected to ensure that the top and bottom end caps 18 and 20 do not bend when a load or pressure is applied to either one of the top and bottom end caps 18 and 20.

The top and bottom end caps 18 and 20 are made from a rigid material such as acrylonitrile butadiene styrene, Delrin®, or acetal. The top and bottom end caps 18 and 20 provide hard attachment points for the tethers 28. The top and bottom end caps 18 and 20 are sealed within and/or to the bladder 22. Thus, fluid is only allowed to enter or exit the bladder 22 through the nozzle 24.

The tethers 28 are made from inextensible elongated structures such as yarn, thread, fishing line, Kevlar®, cable, string, and/or Spectra® fiber. The material strength of the tethers 28 is sufficient to withstand a predetermined load applied to the inflatable structure 12 without the tethers 28 buckling. In addition, the material and/or geometry of the tethers 28 is selected to yield high friction between the tethers 28 and the loops 26. The amount of friction between the tethers 28 and the loops 26 provides a predetermined amount of resistance to deformation or motion of the inflatable structure 12 when a load is applied to the structure 12.

The bladder 22 may be made from a soft inextensible skin. For example, the bladder 22 may be made from silicone, thermoplastic polyurethane (TPU), and/or a TPU-coated fabric. The geometry and material of the bladder 22 is selected to ensure that the bladder 22 does not interfere with the motion of the inflatable structure 12.

The bladder 22 includes a top wall 30, a bottom wall 32, and a plurality of sidewalls 34. The top and bottom walls 30 and 32 of the bladder 22 may extend over the top and bottom end caps 18 and 20, respectively, such that the top and bottom end caps 18 and 20 are entirely disposed within the bladder 22. Alternatively, the top and bottom walls 30 and 32 of the bladder 22 may only extend over perimeter edges 36 of the top and bottom end caps 18 and 20, respectively. In addition, the top and bottom walls 30 and 32 of the bladder 22 may be attached to the perimeter edges 36 of the top and bottom end caps 18 and 20 using, for example, adhesive. Thus, the top and bottom end caps 18 and 20 may be visible from outside of the bladder 22.

Regardless of whether the top and bottom walls 30 and 32 of the bladder 22 extend over the top and bottom end caps 18 and 20, the top and bottom walls 30 and 32 are attached to the top and bottom end caps 18 and 20 using, for example, adhesive. The sidewalls 34 of the bladder 22 are disposed about the perimeter edges 36 of the top and bottom end caps 18 and 20 and extend between the top and bottom end caps 18 and 20.

Each side wall 34 of the bladder 22 includes a plurality of folds 38. Thus, the bladder 22 has an accordion shape. Ideally, the sidewalls 34 of the bladder 22 are flexible in an axial direction 40 of the inflatable structure 12 and are rigid in all radial directions of the inflatable structure 12 including a first radial direction 42 and a second radial direction 44. The folds 38 in the sidewalls 34 of the bladder 22 increase the flexibility of the bladder 22 in the axial direction 40. If the sidewalls 34 of the bladder 22 were straight (i.e., unfolded), the stiffness of the sidewalls 34 in the axial direction 40 would need to be accounted for when determining the amount of bending load that must be applied to reposition the inflatable structure 12. To increase the rigidity of the bladder 22 in the radial direction of the inflatable structure 12, a jacket, rings, or sock may be placed around the sidewalls 34 of the bladder 22.

Each tether 28 has a first end 46 and a second end 48 opposite of the first end 46. In the example shown, a first one of the tethers 28 extends through a first pair of the loops 26, and the first and second ends 46 and 48 of the first tether 28 are fixed to the top end cap 18. In addition, a second one of the tethers 28 extends through a second pair of the loops 26, and the first and second ends 46 and 48 of the second tether 28 are fixed to the top end cap 18. The first tether 28 and the first pair of the loops 26 are disposed within a first plane. The second tether 28 and the second pair of the loops 26 are disposed within a second plane. The first and second planes are parallel to one another.

Referring now to FIGS. 2-9, the inflatable structure 12 is shown in various states and positions. In FIGS. 2 and 7, the inflatable structure 12 is shown in a stowed or uninflated state. When the inflatable structure 12 is in the uninflated state, the inflatable structure 12 as a first height 50. In FIGS. 3 and 8, inflatable structure 12 is shown in a deployed or inflated state. When the inflatable structure 12 is inflated, the top end cap 18 moves away from the bottom end cap 20. Thus, when the inflatable structure 12 is in the inflated state, the inflatable structure 12 has a second height 52 that is greater than the first height 50.

FIGS. 2-9 depict the bottom end cap 20 as being stationary and the top end cap 18 as being movable. However, in various implementations, the top end cap 18 may be stationary and the bottom end cap 20 may be movable. In other implementations, both the top and bottom end caps 18 and 20 may be movable.

When the inflatable structure 12 is initially inflated as shown in FIGS. 3 and 8, the inflatable structure 12 is in a centered position. When a load 54 is applied to the top end cap 18 on the right side of the bladder 22 as shown in FIGS. 3 and 8, the inflatable structure 12 moves from the centered position to a full right position shown in FIGS. 4 and 10. When the load 54 is no longer applied to the top end cap 18, friction between the tethers 28 and the loops 26 holds the inflatable structure 12 in the full right position.

When a load 56 is applied to the top end cap 18 on the left side of the bladder 22 as shown in FIG. 3, the inflatable structure 12 moves from the centered position to a full left position shown in FIG. 6. When the load 56 is no longer applied to the top end cap 18, friction between the tethers 28 and the loops 26 holds the inflatable structure 12 in the full left position. As the inflatable structure 12 moves from the centered position to the full left position, the inflatable structure 12 transitions through an intermediate position shown in FIG. 5.

If the load 56 is released from the top end cap 18 when the inflatable structure 12 is the intermediate position, friction between the tethers 28 and the loops 26 may hold the inflatable structure 12 in the intermediate position. Whether friction between the tethers 28 and the loops 26 holds the inflatable structure 12 in the intermediate position depends on pressure within the bladder 22. Friction between the tethers 28 and the loops 26 holds the inflatable structure 12 in the intermediate position when the bladder pressure is within a predetermined range (e.g., a range from 8 pounds per square inch (psi) to 12 psi).

When the bladder pressure is within the predetermined range, the intermediate positions in which friction between the tethers 28 and the loops 26 may hold the inflatable structure 12 are not limited to the intermediate position shown in FIG. 5. Rather, friction between the tethers 28 and the loops 26 may hold the inflatable structure and infinite intermediate positions between the full right and full left positions. Thus, when the bladder pressure is within the predetermined range, the inflatable structure 12 may be referred to as a posable structure. Friction between the tethers 20 and the loops 26 may only hold the inflatable structure 12 in one of the full right and full left positions when the bladder pressure is greater than or equal to a predetermined pressure (e.g., 215 psi). Thus, when the bladder pressure is greater than or equal to the predetermined pressure, the inflatable structure 12 may be referred to as a bi-stable structure.

With particular reference to FIGS. 8-10, loads acting on the inflatable structure 12 and movement of components within the inflatable structure 12 are illustrated in greater detail. When the inflatable structure 12 is in the centered state as shown in FIG. 8, pressurized fluid within the bladder 22 exerts an upward force 58 on the top end cap 18. In addition, the tethers 28 exert a downward force 60 on the top end cap 18, which limits movement of the top end cap 18 away from the bottom end cap 20.

When an external moment 62 is applied to the top end cap 18 as shown in FIG. 9, the external moment 62 moves the right side of the top end cap 18 downward and thereby urges the tethers 28 to slide through the loops 26 in a left direction 64. However, dynamic friction 66 resists the sliding movement of the tethers 28 through the loops 26 in the left direction 64. The dynamic friction 66 is transmitted through the tethers 28 to the top and bottom plates 18 and 20 as inward forces 68 and outward forces 70. The inward forces 68 counteract the external moment 62 by urging the left sides of the top and bottom plates 18 and 20 one another. The outward forces 70 counteract the external moment 62 by urging the right sides of the top and bottom plates 18 and 20 away from one another. Pressurized fluid within the bladder 22 also contributes to the outward forces 70. If the external moment 62 is released, the dynamic friction 66 stops the right side of the top end cap 18 from moving further downward toward the bottom end cap 20.

It should be understood that applying the load 54 on the right side of the top end cap 18 as shown in FIG. 8 applies the external moment 62 to the top end cap 18 as shown in FIG. 9. In this regard, the load 54 may be referred to as a bending load. The external moment 62 may be applied to the top end cap 18 by hand as shown in FIG. 9. Alternately, the external moment 62 may be applied to the top end cap 18 using one or more reels (not shown). For example, one or more of the loops 26 may be replaced with the reels, the tethers 20 may be wrapped around the reels, and the reels may be operated to move the tethers 28 in the left direction 64 or a right direction 72 (FIG. 10) opposite of the left direction 64. Thus, the shape of the inflatable structure 12 may be changed automatically rather than manually.

In FIG. 10, the external moment 62 is no longer being applied to the inflatable structure 12. Thus, the inward and outward forces 68 and 70 urge the top end cap 18 back to its original position (the position shown in FIG. 8), and thereby urge the tethers 28 to slide through the loops 26 in the right direction 72. However, static friction 74 between the tethers 28 and the loops 26 resists the sliding movement of the tethers 28 through the loops 26 in the right direction 72, and thereby keeps the inflatable structure 12 in equilibrium.

Friction between the threads 28 and the loops 26 may be adjusted to adjust the amount of load required to reposition the inflatable structure 12 between two poses. Friction between the threads 28 and the loops 26 may be adjusted by adjusting the material and/or geometry of the loops 26 and/or the threads 28. For example, friction between the threads 28 and the loops 26 may be increased by coating the threads 28 with a material having a high coefficient of friction. In another example, friction between the threads 20 loops 26 may be increased by adjusting the geometry of the loops 26 to have a tubular shape and thereby increase the amount of surface area contact between the threads 28 and the loops 26.

In addition, friction between the threads 28 and the loops 26 may be tuned after the threads 28 and the loops 26 are assembled in the inflatable structure 12. For example, each loop 26 may include a threaded shaft that threads into the bottom end cap 20, and the threaded shafts may be rotated to twist the tethers 28 around the loops 26 and thereby increase friction between the threads 28 and the loops 26. The threaded shafts of the loops 26 may extend completely through the bottom end cap 20 such that the threaded shafts may be manually rotated (e.g., rotated by hand) or automatically rotated (e.g., rotated using an electric motor).

Referring now to FIGS. 11-13, various kinematic aspects of the inflatable structure 12 are illustrated. As shown in FIG. 11, the top end cap 18 can move in four directions relative to the bottom end cap 20. The movable directions include a first shear direction 76, a second shear direction 78, a bending direction 80, and a bending direction 82. The bending direction 82 is extends about an axis 83 that is perpendicular to the first and second planes. Each movable direction may be referred to as a movable degree of freedom. Thus, the inflatable structure 12 has four movable degrees of freedom.

While the top end cap 18 can move in four directions relative to the bottom and 20, the inflatable structure 12 is only posable in the bending direction 82. In other words, when the top end cap 18 is adjusted from the position shown in FIG. 11 to another position, the inflatable structure 12 only holds the top end cap 18 in the other position when the top end cap 18 is moved in the bending direction 82. For example, when the top end cap 18 is moved in the bending direction 82 from the position shown in FIG. 11 to the position shown in FIG. 13, the inflatable structure 12 holds the top end cap 18 in the position shown in FIG. 13. The top end cap 18 can be returned to the position shown in FIG. 11 by applying a load to the top end cap 18 in a direction opposite of the bending direction 82. Each posable direction may be referred to as a posable degree of freedom. Thus, the inflatable structure 12 has one posable degree of freedom.

As shown in FIG. 12, the inflatable structure 12 has a pure rotation instant center 84 and an instant center translation axis 86. In addition, the inflatable structure 12 has a posable instant center 88. The top end cap 18 rotates about the posable instant center 88 when a load or moment is applied to the top end cap 18 in the bending direction 82. A load applied to the top end cap 18 in the bending direction 82 may be referred to as a bending load.

Referring now to FIGS. 14-16, an inflatable structure 90 is shown that is movable in a first shear direction 92, a second shear direction 94, a first bending direction 96, and a second bending direction 98. However, the inflatable structure 90 is only posable in the first shear direction 92. Thus, the inflatable structure 90 has one posable degree of freedom. The first shear direction 92 is disposed within a plane that is parallel to the major surfaces of the top and bottom plate 18 and 20.

The inflatable structure 90 includes the top end cap 18, the bottom end cap 20, the bladder 22, the loops 26, and the tethers 28. Although not shown, the inflatable structure 90 may also include the nozzle 24. The loops 26 are attached to the top end cap 18 using, for example, a threaded connection. Each tether 28 extends through two of the loops 26, and the first and second ends 46 and 48 of each tether 28 are fixed to the bottom end cap 20 using, for example, adhesive. In addition, each tether 28 has a midpoint 47 disposed midway between the first and second ends 46 and 48, and the midpoint 47 of each tether 28 is fixed to the bottom end cap 20 using, for example, adhesive. Thus, each tether 28 forms an upside-down W shape (or two upside-down V-shapes side-by-side).

A first one of the tethers 28 extends through a first pair of the loops 26. The first tether 28 and the first pair of the loops 26 are disposed within a first plane. A second one of the tethers 28 extends through the second pair of the loops 26. The second tether 28 and the second pair of the loops 26 are disposed within a second plane. The first and second planes are parallel to one another.

As shown in FIG. 15, the inflatable structure 90 has an infinite number of instant centers in a direction 100, and a pair of instant center translation axes 102. In addition, the top end cap 18 of the inflatable structure 90 moves through an arc 104 when a load is applied to the top end cap 18 in the first shear direction 92. A load applied to the top end cap 18 in the first shear direction 92 may be referred to as a shear load.

In FIG. 16, the top end cap 18 has been repositioned relative to its position shown in FIG. 14 by applying a load to the top end cap 18 in the first shear direction 92 and thereby moving the top end cap 18 through the arc 104. Since the inflatable structure 90 is posable in the first shear direction 92, the inflatable structure 90 maintains the top end cap 18 in the position shown in FIG. 16 after the load is removed. The inflatable structure 90 can be returned to the position shown in FIG. 14 by applying a load to the top end cap 18 in a direction opposite of the first shear direction 92.

Figure 17:
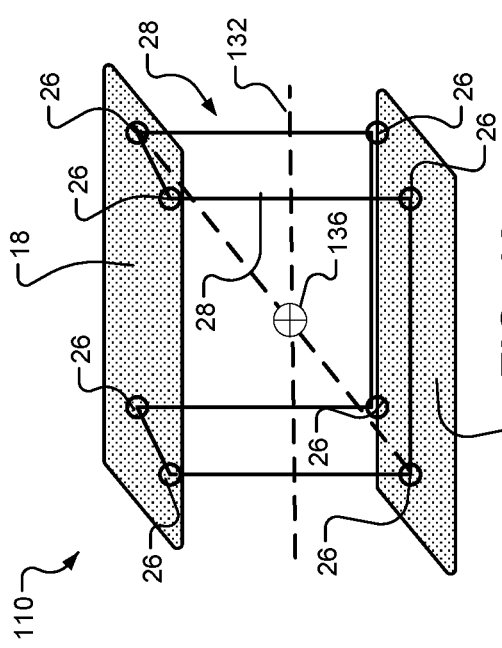
FIG. 17 is a perspective view of another inflatable structure according to the present disclosure in a first position, where the inflatable structure is posable in a second position when one of two bending loads is applied to the inflatable structure.
Figure 18:
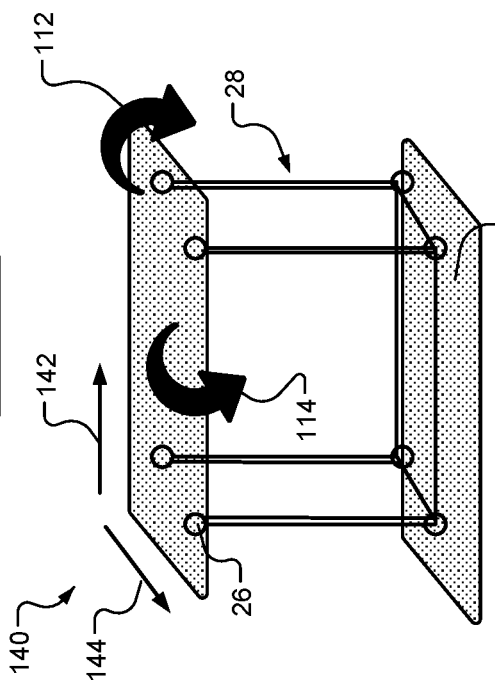
FIG. 18 is a schematic of the inflatable structure of FIG. 17 in the first position.
Figure 19:
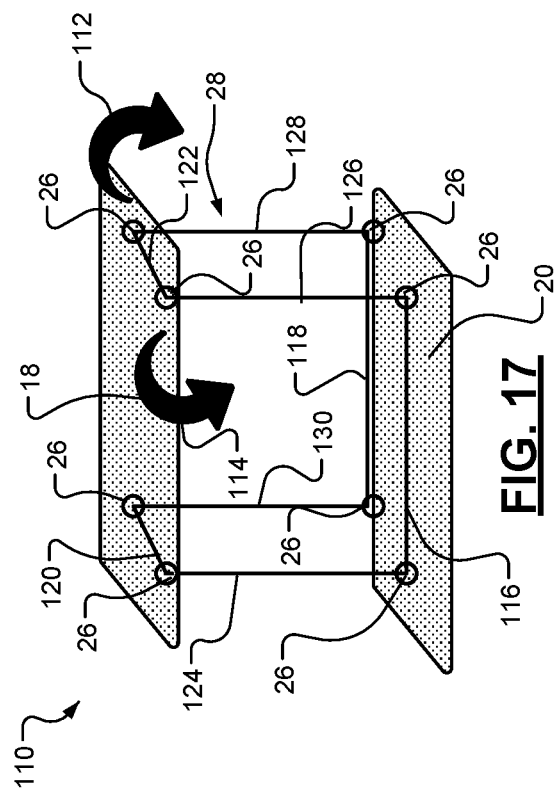
FIG. 19 is a side view of the inflatable structure of FIG. 17 in the second position.

Referring now to FIGS. 17-19 an inflatable structure 110 is shown that is both movable and posable in a first bending direction 112 and a second bending direction 114. Thus, the inflatable structure 90 has two posable degrees of freedom. The inflatable structure 90 includes the top end cap 18, the bottom end cap 20, the bladder 22, the loops 26, and a single tether 28. Although not shown, the inflatable structure 90 may also include the nozzle 24.

The loops 26 are attached to both the top and bottom end caps 18 and 20 using, for example, a threaded connection. The tether 28 extends through all of the loops 26. However, in contrast to other inflatable structures described herein, the tether 28 is not fixed to either one of the top or bottom end caps 18 or 20.

The tether 28 includes a first segment 116 that extends between the first pair of the loops 26, a second segment 118 that extends between a second pair of the loops 26, a third segment 120 that extends between a third pair of the loops 26, and a fourth segment 122 that extends between the fourth pair of the loops 26. The first and second pairs of the loops 26 are attached to the bottom end cap 20 using, for example, a threaded connection. The third and fourth pairs of the loops 26 are attached to the top end cap 18 using, for example, a threaded connection. The tether 28 further includes a fifth segment 124 that extends between the first and third segments 116 and 120, a sixth segment 126 that extends between the first and fourth segments 116 and 122, a seventh segment 128 that extends between the second and fourth segments 118 and 122, and an eighth segment 130 that extends between the second and third segments 118 and 120.

The first, fifth, and sixth segments 116, 124, and 126 of the tether 28 are disposed within a first plane and form a U shape. The second, seventh, and eighth segments 118, 128, and 130 of the tether 28 are disposed within a second plane and form a U shape. The third, fifth, and eighth segments 120, 124, and 130 of the tether 28 are disposed within a third plane and form an upside-down U shape. The fourth, sixth, and seventh segments 122, 126, and 128 of the tether 28 are disposed with and a fourth plane and form an upside-down U shape.

The first and second planes are parallel to one another, and the third and fourth planes are parallel to one another. In addition, the third and fourth planes are perpendicular to the first and second planes. The first bending direction 112 extends about an axis that is perpendicular to the first and second planes and parallel to the third and fourth points. The second bending direction 114 extends about an axis that is parallel to the first and second planes and perpendicular to the third and fourth planes.

As shown in FIG. 18, the inflatable structure 110 has first instant center axis 132, a second instant center axis 134 that is perpendicular to the first instant center axis 132, and a single instant center 136. The first and second instant center axes 132 and 134 are disposed within a common plane. The top end cap 18 of the inflatable structure 110 rotates about the instant center 136 when a load or moment is applied to the top end cap 18 in either one of the first and second bending directions 112 and 114. A load applied to the top end cap 18 in either one of the first and second bending directions 112 and 114 may be referred to as a bending load.

In FIG. 19, the top end cap 18 has been repositioned relative to its position shown in FIG. 17 by applying a load to the top end cap 18 in the first bending direction 112. Since the inflatable structure 110 is posable in the first bending direction 112, the inflatable structure 110 maintains the top end cap 18 in the position shown in FIG. 19 after the load is removed. The inflatable structure 110 can be returned to the position shown in FIG. 17 by applying a load to the top end cap 18 in a direction opposite of the first bending direction 112.

Figure 20:
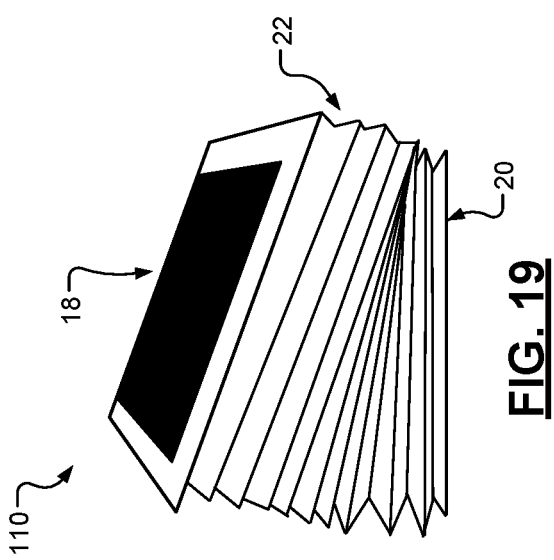
FIG. 20 is a perspective view of another inflatable structure according to the present disclosure in a first position, where the inflatable structure is posable in a second position when one of two bending loads is applied to the inflatable structure.

Referring now to FIG. 20 an inflatable structure 140 is shown that, like the inflatable structure 110, is both movable and posable in the first and second bending directions 112 and 114. However, in contrast to the inflatable structure 110, the inflatable structure 140 is also movable in a first shear direction 142 and the second shear direction 144. Nonetheless, the inflatable structure 140 is not posable in the first or second shear directions 142 or 144. Thus, like the inflatable structure 110, the inflatable structure 140 has two posable degrees of freedom.

The inflatable structure 140 is nearly identical to the inflatable structure 110 except that the tether 28 is routed differently in the inflatable structure 140 relative to the way in which the tether 28 is muted in the inflatable structure 110. In the inflatable structure 140, the tether 28 does not extend between any of the loops 26 attached to the top end cap 18. Instead, the tether 28 extends upward from each loop 26 on the bottom end cap 20 to one of the loops 26 on the top end cap 18, extends through that loop 26, and extends back downward to the same loop 26 on the bottom end cap 20. Thus, the tether 28 includes two segments extending between each pair of the loops 26 that are vertically aligned.

Referring again to FIG. 18, like the inflatable structure 110, the inflatable structure 140 has the first instant center axis 132, the second instant center axis 134, and the single instant center 136. In addition, the top end cap 18 may be adjusted from the position shown in FIG. 20 to the position shown in FIG. 19 by applying a load or moment in the first bending direction 112. Further, since the inflatable structure 140 is posable in the first bending direction 112, the inflatable structure 140 will maintain the top end cap 18 in the position shown in FIG. 19 after the load is removed. The inflatable structure 140 can be returned to the position shown in FIG. 20 by applying a load to the top end cap 18 in a direction opposite of the first bending direction 112.

Referring now to FIGS. 21-23, an inflatable structure 150 is shown that is movable in a first shear direction 152, a second shear direction 154, a first bending direction 156, and a second bending direction 158. However, the inflatable structure 150 is only posable in the first shear direction 152 and the first bending direction 156. Thus, the inflatable structure 150 has two posable degrees of freedom. The first shear direction 152 is disposed within a plane that is parallel to the major surfaces of the top and bottom plate 18 and 20.

The inflatable structure 150 includes the top end cap 18, the bottom end cap 20, the bladder 22, the loops 26, and the tethers 28. Although not shown, the inflatable structure 150 may also include the nozzle 24. The loops 26 are attached to the top and bottom end caps 18 and 20 using, for example, a threaded connection. Each tether 28 extends through two of the loops 26 and one of the loops 26 attached to the bottom end cap 20, and the first and second ends 46 and 48 of each tether 28 are fixed to the bottom end cap 20 using, for example, adhesive. Thus, each tether 28 forms an M shape.

A first one of the tethers 28 extends through a first pair of the loops 26 attached to the top end cap 18 and a first one of the loops 26 attached to the bottom end cap 20. The first tether 28, the first pair of the loops 26 attached to the top end cap 18, and the first loop 26 attached to the bottom end cap 20 are disposed within a first plane. A second one of the tethers 28 extends through a second pair of the loops 26 attached to the top end cap 18 and a second one of the loops 26 attached to the bottom end cap 20. The second tether 28, the second pair of the loops 26 attached to the top end cap 18, and the second loop 26 attached to the bottom end cap 20 are disposed within a second plane. The first and second planes are parallel to one another. The first bending direction 156 extends about an axis that is perpendicular to the first and second planes.

As shown in FIG. 22, the inflatable structure 150 has an infinite number of instant centers in a direction 160, a pair of instant center translation axes 162, and a pure rotation instant center 164. In addition, the top end cap 18 of the inflatable structure 150 moves through an arc 166 when a load is applied to the top end cap 18 in the first shear direction 152. A load applied to the top end cap 18 in the first shear direction 152 may be referred to as a shear load.

In FIG. 23, the top end cap 18 has been repositioned relative to its position shown in FIG. 21 by applying a load to the top end cap 18 in the first shear direction 152 and thereby moving the top end cap 18 through the arc 166. Since the inflatable structure 150 is posable in the first shear direction 152, the inflatable structure 150 maintains the top end cap 18 in the position shown in FIG. 23 after the load is removed. The inflatable structure 150 can be returned to the position shown in FIG. 21 by applying a load to the top end cap 18 in a direction opposite of the first shear direction 152.

Referring now to FIGS. 21-27, an inflatable structure 170 is shown that is movable in a first shear direction 172, a second shear direction 174, a first bending direction 176, and a second bending direction 178. However, the inflatable structure 170 is only posable in the first shear direction 172 and the first bending direction 176. Thus, the inflatable structure 170 has two posable degrees of freedom. The first shear direction 172 is disposed within a plane that is parallel to the major surfaces of the top and bottom plate 18 and 20.

The inflatable structure 170 includes the top end cap 18, the bottom end cap 20, the bladder 22, the loops 26, and a single tether 28. Although not shown, the inflatable structure 170 may also include the nozzle 24. The loops 26 are attached to the top and bottom end caps 18 and 20 using, for example, a threaded connection.

The tether 28 includes a first segment 180, a second segment 182, a third segment 184, and a fourth segment 186. The first segment 180 of the tether 28 extends between a first pair of the loops 26 attached to the top end cap 18 and has a midpoint 188 that is fixed to the bottom end cap 20. The second segment 182 of the tether 28 extends between a second pair of the loops 26 attached to the top end cap 18 and has a midpoint 190 that is fixed to the bottom end cap 20. The third segment 184 of the tether 28 extends between one end of each of the first and second segments 180 and 182 of the tether 28 and extends through a third pair of the loops 26, which are attached to the bottom end cap 20. The fourth segment 186 of the tether 28 extends between the other end of each of the first and second segments 180 and 182 of the tether 28 and extends through a fourth pair of the loops 26, which are attached to the bottom end cap 20.

The first segment 180 of the tether 28 and the first pair of the loops 26 are disposed within a first plane. The second segment 180 of the tether 28 and the second pair of the loops 26 are disposed within a second plane. The first and second planes are parallel to one another. The third segment 184 of the tether 28 and the third pair of the loops 26 are disposed within a third plane. The fourth segment 186 of the tether 28 and the fourth pair of the loops 26 are disposed within a fourth plane. The third and fourth planes are perpendicular to the first and second planes. In addition, the third and fourth planes form an acute angle with one another.

As shown in FIG. 25, the inflatable structure 170 has an infinite number of instant centers in a direction 192, a pair of instant center translation axes 194, and a pure rotation instant center 196. In addition, the top end cap 18 of the inflatable structure 150 moves through an arc 198 when a load is applied to the top end cap 18 in the first shear direction 172. A load applied to the top end cap 18 in the first shear direction 172 may be referred to as a shear load.

Further, as shown in FIG. 26, the inflatable structure 170 has a posable instant center 200. The top end cap 18 rotates about the posable instant center 200 when a load or moment is applied to the top end cap 18 in the first bending direction 176. A load applied to the top end cap 18 in the first bending direction 176 may be referred to as a bending load.

In FIG. 27, the top end cap 18 has been repositioned relative to its position shown in FIG. 24 by applying a load to the top end cap 18 in the first shear direction 172 and thereby moving the top end cap 18 through the arc 198. Since the inflatable structure 170 is posable in the first shear direction 172, the inflatable structure 170 maintains the top end cap 18 in the position shown in FIG. 27 after the load is removed. The inflatable structure 150 can be returned to the position shown in FIG. 24 by applying a load to the top end cap 18 in a direction opposite of the first shear direction 172.

Referring now to FIGS. 28-30, an inflatable structure 202 similar or identical to the inflatable structure 12 forms a joint 204. In the example shown, the inflatable structure 202 is incorporated in in a flexible arm 206 of a gooseneck lamp 208. However, the inflatable structure 202 may be used in other applications such as a sun shade, a cup holder, a display interface, or a gooseneck microphone.

In addition to the arm 206, the joint 204 includes rigid segments 210 attached to opposite ends of the joint 204. The rigid segments 210 may be internally tensioned inflatable structures that are not movable or posable (i.e., inflatable structures with zero movable degrees of freedom).

To adjust the flexible arm 206 from the position shown in FIG. 28 to the position shown in FIG. 29, a moderate external load 212 is applied to one of the rigid segments 210 to apply a bending moment 214 to the inflatable structure 202. As the bending moment 214 is applied to the inflatable structure 202, the bottom end cap 20 moves relative to the top end cap 18 from the position shown in FIG. 28 to the position shown in FIG. 29. This movement of the bottom 20 causes the tethers 28 to slide through the loops 26 in a direction 216. Dynamic friction between the tethers 28 and the loops 26 resist the sliding motion of the tethers 28 through the loops 26 in the direction 216. When the bending moment 214 is released, static friction between the tether 28 and the loops 26 maintains the bottom end cap 20 in the position shown in FIG. 29. In addition, the static friction between the tether 28 and the loops 26 is sufficient to maintain the bottom end cap 20 in the position shown in FIG. 29 when a light external load 218 is applied to one of the rigid segments 210.

Referring now to FIGS. 31-36, an inflatable structure 220 similar or identical to any of the inflatable structures described herein includes a clamp 222 that is adjustable to lock all of the degrees of freedom of the inflatable structure 220. In the example shown, the inflatable structure 220 is incorporated in an adjustable footrest 224 of a reclining chair 226. However, the inflatable structure 220 may be used in other applications such as an adjustable armrest or a reconfigurable headrest.

In addition to the inflatable structure 220, the footrest 224 includes a seat bottom 228, or at least a portion thereof, and a leg support 230. The leg support 230 forms the top end cap 18, and the seat bottom 228 forms the bottom end cap 20. In FIG. 33, the footrest 224 is shown in an uninflated or stowed position. To adjust the footrest 224 from the stowed position to an inflated or deployed position, the bladder 22 is inflated. Although not shown, the inflatable structure 220 may include the nozzle 24, and the bladder 22 may be inflated by activating a compressor in fluid communication with the bladder 22 through the nozzle 24. When the bladder 22 is initially inflated, the footrest 224 may assume the position shown in FIGS. 31 and 34.

To maintain the footrest 224 in the position shown in FIGS. 31 and 34 when an occupant 232 places an external load 234 on the footrest 224, the occupant 232 adjusts the clamp 222 from a released position shown in FIG. 31 to an engaged position shown in FIG. 32. When the clamp 222 is engaged, the clamp 222 presses the tethers 28 against the seat bottom 228 and thereby prevents the tethers 28 from sliding through the loops 26 in a first direction 236 or a second direction opposite of the first direction 236. In turn, the inflatable structure 220 becomes a rigid structure with zero degrees of freedom, and the footrest 224 is not movable in any direction.

To raise the footrest 224 from the position shown in FIGS. 31 and 34 to the position shown in FIGS. 35 and 36, the occupant 232 releases the clamp 222 so that the pose of the footrest 224 may be manually adjusted. The occupant 232 manually adjusts the pose of the footrest 224 by applying an upward load 238 to a knob 240 on the leg support 230. Applying the upward load 238 to the knob 240 on the leg support 230 applies a bending moment 242 to the inflatable structure 220 of the footrest 224, which causes the leg support 230 to move in the direction in which the upward load 238 applied. In turn, the tethers 28 slide through the loops 26 in the second direction. When the occupant 232 releases the upward load 238 from the knob 240 on the leg support 230, static friction between the tethers 28 and the loops 26 keeps the footrest 224 in the position in which the upward load 238 is released. The occupant 232 may then reengage the clamp 222 to ensure that the footrest 224 stays in that position when the external load 234 is applied to the footrest 224.

The clamp 222 may be manually adjusted or automatically adjusted. In an example of the latter, a linear actuator control module 244 controls a linear actuator 246 to move the clamp 222 between the released position shown in FIG. 31 and the engaged position shown in FIG. 32. The linear actuator control module 244 may adjust the clamp 222 between the released and engaged positions based on an input from the occupant 232. For example, the occupant 232 may toggle a switch 248 between two positions to send a signal to the linear actuator control module 244 indicating an instruction to engage or release the clamp 222.

In the discussion above, the clamp 222 is adjusted between the released position, in which the clamp 222 allows the tethers 28 to slide freely through the loops 26, and the engaged position, in which the clamp 222 prevents any sliding of the tethers 28 through the loops 26. However, the clamp 222 may be adjusted to a plurality of positions between the released and engaged positions. In this regard, the clamp 222 may act as a clutch that gradually adjusts the external load required to adjust the pose of the inflatable structure 220. In addition, the clamp 222 may act as a one-way clutch by allowing the tethers 28 to slide freely through the loops 26 in one direction while restricting or preventing the loops 26 from sliding in the opposite direction. In turn, the clamp 222 may prevent the inflatable structure 220 from moving in one direction of its posable degree of freedom while allowing the inflatable structure 220 to move in the other direction of its posable degree of freedom. The clamp 222 may include a one-way mechanism, such as those found in a sailing cleat, which enables the clamp 222 to act as a one-way clutch.

In addition, while FIGS. 31-36 show one type of a clamp, an inflatable structure according to the present disclosure may include other types of clamps. For example, referring again to FIG. 1, one or more of the loops 26 may be used as a clamp by translating the loops 26 in the axial direction 40 and thereby clamp the tethers 28. In addition, the linear actuator control module 244 and the linear actuator 246 of FIGS. 31 and 32 may be used to automatically translate the loops 26 in the axial direction 40. Further, the loops 26 may include a threaded shaft that threads into the bottom end cap 20, and the linear actuator 246 may be an electric motor that screws or unscrews the loops 26 relative to the bottom end cap 20.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," "top," "bottom," "side," and "disposed." Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly. In addition, unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Per, Pascal, Curl, OCaml, Javascript®, HTML5 (Hypertext Markup Language fifth revision), Ada, ASP (Active Server Pages), PHP (PHP: Hypertext Preprocessor), Scala, Eiffel, Smalltalk, Erlang, Ruby, Flash@, Visual Basic®, Lua, MATLAB, SIMULINK, and Python@.

What is claimed is:

1. An inflatable structure comprising:
a top end cap;
a bottom end cap;
a bladder attached to the top and bottom end caps and configured to hold pressurized fluid between the top and bottom end caps;
a nozzle configured to allow fluid to enter and exit the bladder;
at least one loop attached to one of the top and bottom end caps; and
a first tether disposed within the bladder, coupled to the other one of the top and bottom end caps, and extending through the at least one loop, wherein the top end cap assumes a first position when the bladder is inflated and, when the top end cap is adjusted from the first position to a second position, the first tether is configured to maintain the top end cap in the second position.

2. The inflatable structure of claim 1 wherein when a compressive load is applied to the top end cap, friction between the first tether and the at least one loop prevents the first tether from sliding through the at least one loop, and thereby maintains the top end cap in the second position.

3. The inflatable structure of claim 1 wherein the bladder is disposed about and attached to perimeter edges of the top and bottom end caps.

4. The inflatable structure of claim 1 wherein the bladder includes sidewalls, and each of the sidewalls includes a plurality of folds that reduce a stiffness of the sidewalls in an axial direction of the inflatable structure.

5. The inflatable structure of claim 1 wherein:
the first tether is coupled to the top end cap;
the first tether has a first end and a second end opposite of the first end; and
the first and second ends of the first tether are fixed to the bottom end cap.

6. The inflatable structure of claim 1 wherein the at least one loop includes a first pair of loops attached to the bottom end cap, and the first tether extends through the first pair of loops.

7. The inflatable structure of claim 6 further comprising:
a second pair of loops attached the bottom end cap; and
a second tether coupled to the top end cap and extending through the second pair of loops attached to the bottom end cap, wherein when the top end cap is adjusted from the first position to the second position, the first and second tethers are configured to maintain the top end cap in the second position.

8. The inflatable structure of claim 7 wherein the first tether is disposed within a first plane and the second tether is disposed within a second plane that is parallel to the first plane.

9. The inflatable structure of claim 7 wherein:
each of the first and second tethers has a first end and a second end opposite of the first end;
the first and second ends of each of the first and second tethers are fixed to the top end cap; and
the first and second tethers are configured to maintain the top end cap in the second position when the top end cap is adjusted from the first position to the second position by applying a bending load to the top end cap.

10. The inflatable structure of claim 7 wherein:
each of the first and second tethers has a first end, a second end opposite of the first end, and a midpoint disposed midway between the first and second ends;
the first end, the second end, and the midpoint of each of the first and second tethers are fixed to the top end cap; and
the first and second tethers are configured to maintain the top end cap in the second position when the top end cap is adjusted from the first position to the second position by applying a shear load to the top end cap.

11. The inflatable structure of claim 6 further comprising:
a second pair of loops attached to the bottom end cap;
a third pair of loops attached to the top end cap; and
a fourth pair of loops attached to the top end cap, wherein:
the first tether extends through the first, second, third, and fourth pairs of loops; and
the first tether is configured to maintain the top end cap in the second position when the top end cap is adjusted from the first position to the second position by applying a bending load to the top end cap.

12. The inflatable structure of claim 6 further comprising:
a second pair of loops attached the bottom end cap;
a third pair of loops attached to the top end cap; and
a fourth pair of loops attached to the top end cap, wherein:
the first tether extends through the first, second, third, and fourth pairs of loops;
the first tether includes a first segment and a second segment;
the first segment extends between the third pair of loops and is fixed to the bottom end cap;
the second segment extends between the fourth pair of loops and is fixed to the bottom end cap; and
the first tether is configured to maintain the top end cap in the second position when the top end cap is adjusted from the first position to the second position by applying either one of a bending load or a shear load to the top end cap.

13. The inflatable structure of claim 1 wherein:
the at least one loop includes a first pair of loops attached to the top end cap;
the first tether has a first end and a second end opposite of the first end;
the first and second ends of the first tether are fixed to the bottom end cap;
the inflatable structure further comprises:
a second pair of loops attached to the top end cap;
a first loop attached to the bottom end cap;
a second loop attached to the bottom end cap; and
a second tether having a first end and a second end opposite of the first end;
the first and second ends of the second tether are fixed to the bottom end cap;
the first tether extends through the first pair of loops and the first loop;
the second tether extends through the second pair of loops and the second loop; and the first and second tethers are configured to maintain the top end cap in the second position when the top end cap is adjusted from the first position to the second position by applying either one of a bending load or a shear load to the top end cap.

14. An inflatable structure comprising:
a top end cap;
a bottom end cap;
a bladder attached to the top and bottom end caps and configured to hold pressurized fluid between the top and bottom end caps;
a nozzle configured to allow fluid to enter and exit the bladder;
a pair of loops attached to the bottom end cap;
a tether disposed within the bladder, coupled to the top end cap, and extending through the pair of loops; and
a clamp attached to the bottom end cap and adjustable between a first position and a second position, wherein:
when the clamp is in the first position, the clamp allows the tether to slide through the pair of loops and thereby allows the top end cap to be repositioned relative to the bottom end cap; and
when the clamp is in the second position, the clamp prevents the tether from sliding through the pair of loops and thereby maintains a position of the top end cap relative to the bottom end cap.

15. The inflatable structure of claim 14 wherein at least one loop of the pair of loops comprises the clamp, and the clamp is adjusted from the first position to the second position by moving the at least one loop toward the bottom end cap to clamp the tether between the at least one loop and the bottom end cap.

16. The inflatable structure of claim 14 wherein the pair of loops includes a first loop and a second loop, and the clamp is disposed between the first and second loops.

17. An inflatable system comprising:
an inflatable structure including a top end cap, a bottom end cap, a bladder attached to the top and bottom end caps and configured to hold pressurized fluid between the top and bottom end caps, a nozzle configured to allow fluid to enter and exit the bladder, at least one loop attached to one of the top and bottom end caps, and a first tether disposed within the bladder, coupled to the other one of the top and bottom end caps, and extending through the at least one loop, wherein the top end cap assumes a first position when the bladder is inflated and, when the top end cap is adjusted from the first position to a second position, the first tether is configured to maintain the top end cap in the second position;
a compressor in fluid communication with the bladder through the nozzle and operable to inflate the bladder; and
a compressor control module configured to control the compressor to adjust a pressure within the bladder between a first pressure and a second pressure that is less than the first pressure, wherein:
the at least one tether is configured to maintain the top end cap in any one of M positions when the bladder pressure is equal to the first pressure;
the at least one tether is configured to maintain the top end cap in any one of N positions when the bladder pressure is equal to the second pressure; and
M and N are numbers, and N is greater than M.

18. The inflatable system of claim 17 wherein:
the at least one loop includes a first pair of loops attached to the bottom end cap; and
the first tether has a first end and a second end opposite of the first end, wherein the first tether extends through the first pair of loops, and the first and second ends of the first tether are fixed to the top end cap.

19. The inflatable system of claim 18 wherein:
the at least one loop further includes a second pair of loops attached to the bottom end cap; and
the inflatable structure further includes a second tether having a first end and a second end opposite of the first end, wherein the second tether extends through the second pair of loops, and the first and second ends of the second tether are fixed to the top end cap.

20. The inflatable system of claim 19 wherein the first tether is disposed within a first plane and the second tether is disposed within a second plane that is parallel to the first plane.

* * * * *